E. BOCKSHE.
ADJUSTABLE CASING FOR GRINDERS.
APPLICATION FILED APR. 29, 1918.
1,298,653.
Patented Apr. 1, 1919.
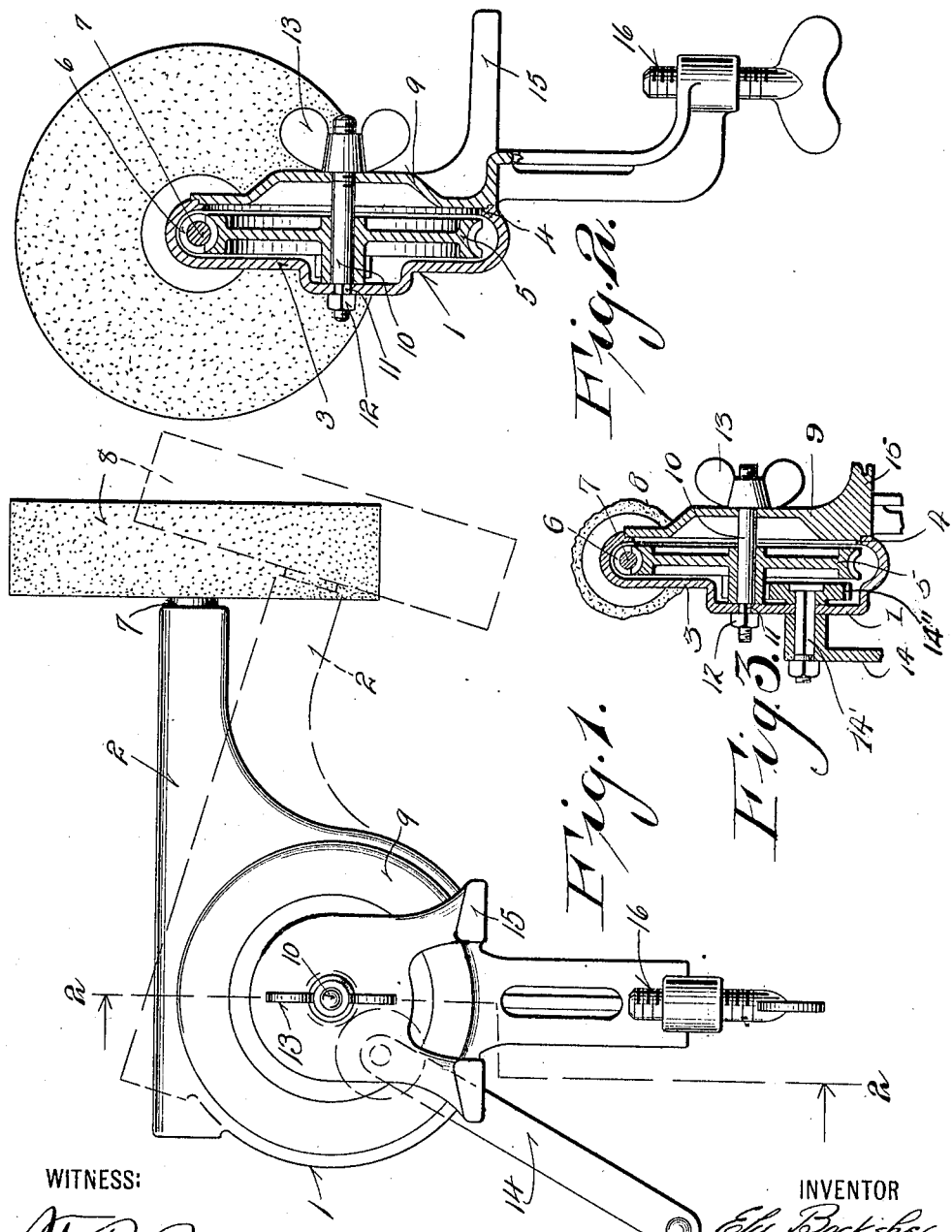
WITNESS:
J. P. Britt
INVENTOR
Ely Bockshe
BY Geo. W. Young
ATTORNEY

UNITED STATES PATENT OFFICE.

ELY BOCKSHE, OF MILWAUKEE, WISCONSIN, ASSIGNOR TO MODERN GRINDER MANUFACTURING CO., OF MILWAUKEE, WISCONSIN.

ADJUSTABLE CASING FOR GRINDERS.

1,298,653.  Specification of Letters Patent.  Patented Apr. 1, 1919.

Application filed April 29, 1918. Serial No. 231,366.

*To all whom it may concern:*

Be it known that I, ELY BOCKSHE, a citizen of the United States, and resident of Milwaukee, in the county of Milwaukee and State of Wisconsin, have invented certain new and useful Improvements in Adjustable Casings for Grinders; and I do hereby declare that the following is a full, clear, and exact description thereof.

This invention relates to improvements in tool grinders and similarly operated machines.

The principal object of the invention is to construct a device of this character in a simple and compact manner whereby to not only increase the efficiency of the same, but also to decrease the manufacturing cost.

Another important object is to provide means for adjustably connecting the tool grinder proper with a stationary support.

With these and other objects in view, the invention resides in the novel features of construction, combination and arrangement of parts which will hereinafter be more particularly described, claimed, and shown in the drawing wherein:—

Figure 1 represents a side elevational view of a device constructed in accordance with the invention.

Fig. 2 is a transverse, sectional view taken on the plane of the line 2—2 of Fig. 1.

Fig. 3 is a detail sectional view showing the drive connection between the operating handle and the worm gear of the grinder.

In the accompanying drawing, the numeral 1 denotes a one-piece gear case from the upper portion of which projects an elongated bearing sleeve 2, the same being preferably formed integrally with the former; the bearing sleeve has its axis disposed at right angles to the axis of the gear casing. Said gear casing is substantially circular in front or rear elevation and has one solid wall 3, the opposite wall being provided with a circular opening 4 concentric with its periphery. A worm gear 5 of substantially the same diameter as the opening 4 is designed to be inserted into the gear case therethrough. The teeth of the gear 5 mesh with a worm 6 formed on a spindle 7 which is journaled in the bearing sleeve 2, whereby upon rotation of said gear, the spindle and the abrading wheel 8, or the like, carried thereby will be operated.

The wall of the gear case immediately surrounding the opening 4 is shouldered to form a lap joint with an annular shoulder formed adjacent the periphery of a circular cover plate 9, the latter effectively closing the opening into the gear case. Said cover 9 is secured to the gear case by means of an axle bolt 10 which projects through said cover plate and the wall 3, it being held against movement with respect to the latter by being shouldered as at 11 and having a nut 12 threaded on the reduced portion formed by the shoulder. The opposite end of the bolt 10 is threaded and receives a wing nut 13, which engages the cover 9, as shown. The worm gear 5 is loosely mounted for rotation on the axle bolt 10. Any preferred means may be used for revolving the gear, for instance it may be rotated by means of the rotation of a crank handle 14 mounted on the shaft 14' journaled in the casing and carrying a gear 14" in mesh with teeth on the hub of the worm gear 5.

Formed integrally with or otherwise connected to the cover 9 is a supporting member formed by the clamp jaws 15 and a screw-operated jaw 16, whereby it may be secured to any suitable relatively stationary support. When once so mounted the spindle 7 may be disposed in various adjusted positions, either horizontally or vertically, or in any intermediate position, as indicated in Fig. 1. Such adjustment is readily procured to the swiveled connection between the gear case proper and the cover 9. In other words, by loosening the wing nut 13, the gear case and the parts carried thereby may be shifted around an axis formed by the bolt 10, and when the desired position has been reached and the wing nut 13 tightened, the abrading member 8, or the like, will be disposed in a new position. The lap joint connection between the gear case and cover effectively prevents the access of dust or the like to the former and renders the housing of the operating members complete.

I claim:

1. In a device of the class described, a gear case comprising a movable housing portion and a stationary cover for the housing portion, a gear in the housing portion, means for rotating the gear, a shaft carried by the housing portion to be driven by said gear, and a clamping screw extending through the housing portion and cover to draw the same together, whereby to secure the former in adjusted positions with respect to the latter.

2. In a device of the class described, a gear case comprising a movable housing portion and a stationary cover for the housing portion, a gear in the housing portion, means for rotating the gear, a shaft carried by the housing portion to be driven by said gear, an axle extending through the housing portion and cover and having the gear journaled thereon, and means on the ends of the axle for drawing the housing portion and cover together, whereby to secure the former in adjusted positions with respect to the latter.

In testimony that I claim the foregoing I have hereunto set my hand at Milwaukee, in the county of Milwaukee and State of Wisconsin.

ELY BOCKSHE.

Copies of this patent may be obtained for five cents each, by addressing the "Commissioner of Patents, Washington, D. C."